United States Patent [19]

HaBmann

[11] Patent Number: 4,572,569

[45] Date of Patent: Feb. 25, 1986

[54] PIVOTABLE BACK-REST, PARTICULARLY FOR THE REAR BENCH SEATS IN MOTOR VEHICLES

[75] Inventor: Franz HaBmann, Gross-Bieberau, Fed. Rep. of Germany

[73] Assignee: General Motors Corporation, Detroit, Mich.

[21] Appl. No.: 602,123

[22] Filed: Apr. 19, 1984

[30] Foreign Application Priority Data

May 3, 1983 [DE] Fed. Rep. of Germany ....... 3316024

[51] Int. Cl.$^4$ ............................................ B60R 21/10
[52] U.S. Cl. ................................... 296/65 R; 297/378
[58] Field of Search .................... 296/63, 65 R, 69; 297/378, 379

[56] References Cited

U.S. PATENT DOCUMENTS

| | | | |
|---|---|---|---|
| 4,169,626 | 10/1979 | Hollar, Jr. | 297/378 |
| 4,268,086 | 5/1981 | Okuyama | 297/379 |
| 4,394,047 | 7/1983 | Bunelle | 297/378 |
| 4,475,763 | 10/1984 | Hamatani et al. | 296/65 R |

FOREIGN PATENT DOCUMENTS 1092321 11/1956 Fed. Rep. of Germany .

Primary Examiner—Robert R. Song
Attorney, Agent, or Firm—William A. Schuetz

[57] ABSTRACT

A swingable seat back, especially for use with motor vehicle seats, is being proposed. The seat back is latchable when in its upright position and can be folded down by being moved about a pivot axis which is variable in height. The pivot axis is formed by pivot bolts disposed on either side of the lower seat back portion and provided with collars. Said pivot bolts are adapted for engagement in respective guide slots provided in hinges secured to the vehicle body, and are caused to move in the guide slots when the seat back is folded down. The arrangement is such that one pair of bolts is guided in each of the slotted guide means, and that the slotted guide means are Y-shaped and arranged such that a first guide track is provided from which a second guide track, which is forming the fork of the Y-shape, is branching off, and wherein the second guide track is provided with an upwardly open mounting slot.

9 Claims, 6 Drawing Figures

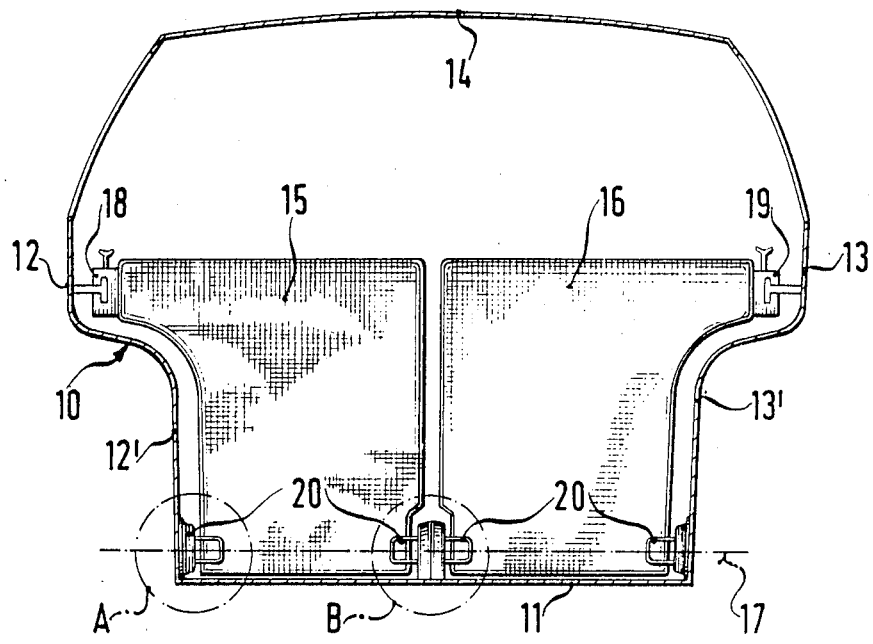
FIG. 1
FIG. 2
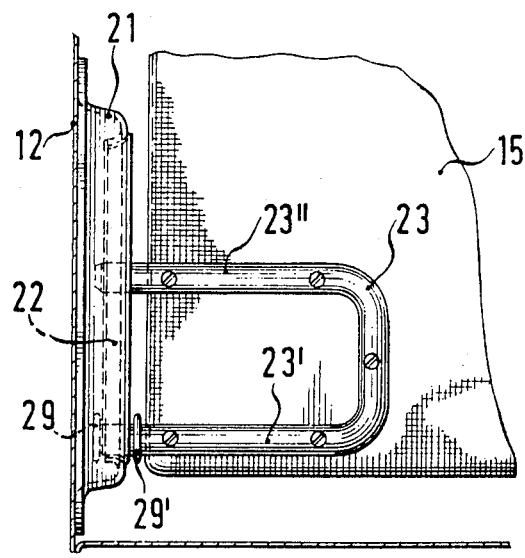

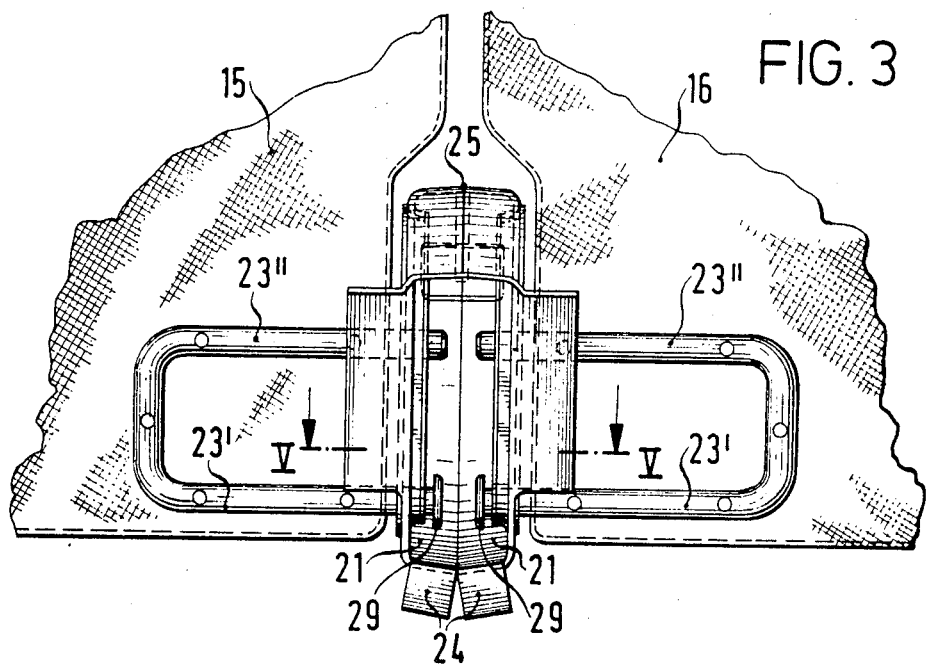
FIG. 3
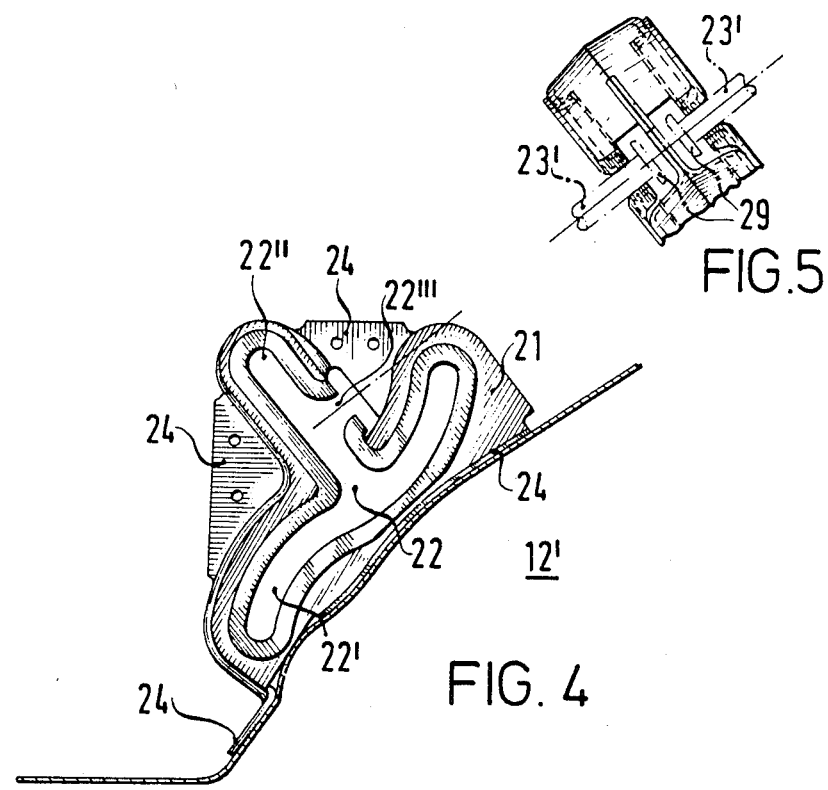
FIG. 5
FIG. 4

PIVOTABLE BACK-REST, PARTICULARLY FOR THE REAR BENCH SEATS IN MOTOR VEHICLES

The invention relates to a swingable seat back, especially a seat back for use in motor vehicles, said seat back being latchable when in its normal upright position and being adapted to be folded down into a horizontal position by swinging movement about a pivot axis which is variable in height. The pivot axis is formed by headed pivot bolts disposed on either side of the lower seat back portion which engage associated slotted guide members of a vehicle mounted hinge mechanism and which are adapted for displacement within said slotted guide members as the seat back is folded down.

Prior art seat backs of this type are unduly complicated in design and are not suitable for easy assembly. Furthermore, the hinge mechanisms of prior art seat backs are relatively bulky and are difficult to accommodate within the limited space available between the seat bottom or seat back and the vehicle side panels. These difficulties are even more evident if optimum use must be made of the available space in the structural development of the seat bottoms and seat backs. It is the objective of the present invention to eliminate these disadvantages and to provide a foldable seat back which is simple in design, easy to install and compact in structure, but which, nevertheless, can easily be folded from a vertical (seat-occupying) position into a horizontal position.

In accordance with the present invention, this objective is being achieved with a seat back of the type described in the foregoing in that a pair of pivot bolts is guided in each of the slotted guide members, and in that the slotted guide members are Y-shaped and are comprised, respectively of a first and a second track element, with the second track element branching off the first track element so as to form the fork of the Y configuration and bing provided with an upwardly open mounting slot. The particular advantage of this arrangement is that the seat back can be easily inserted from above through the open mounting slot into the slotted guide member and be located in its upright position. The removal of the seat, which may become necessary occasionally, may proceed in reverse order. The hinge mechanism, which is comprised of the pivot bolts and the slotted guide member, is of relatively simple design and inexpensive to manufacture and does not protrude into the inside compartment of the vehicle, so that optimum use is made of the available space.

Other details and advantages of the invention will become apparent from the sub-claims and the following description of one exemplary embodiment wherein:

FIG. 1 is a schematic illustration of a split rear seat back of a passenger car as viewed from the rear;

FIG. 2 is an enlarged, detailed illustration of the left seat back hinge shown in the area designated by the letter A, also as viewed from the rear;

FIG. 3 is an enlarged, detailed illustration of the hinge disposed in the mid-portion of the seat back shown in the area designated by the letter B, also as viewed from the rear;

FIG. 4 is a side view of the slotted guide member of the seat back hinge;

FIG. 5 is the inner hinge of the seat back shown in section along line V—V of FIG. 3, with the seat back being in the installed position; and, FIG. 6 is a schematic illustration of the entire seat showing the seat bottom and seat back in various pivoting positions as well as depicting the installation position of the seat back.

Figure 6:
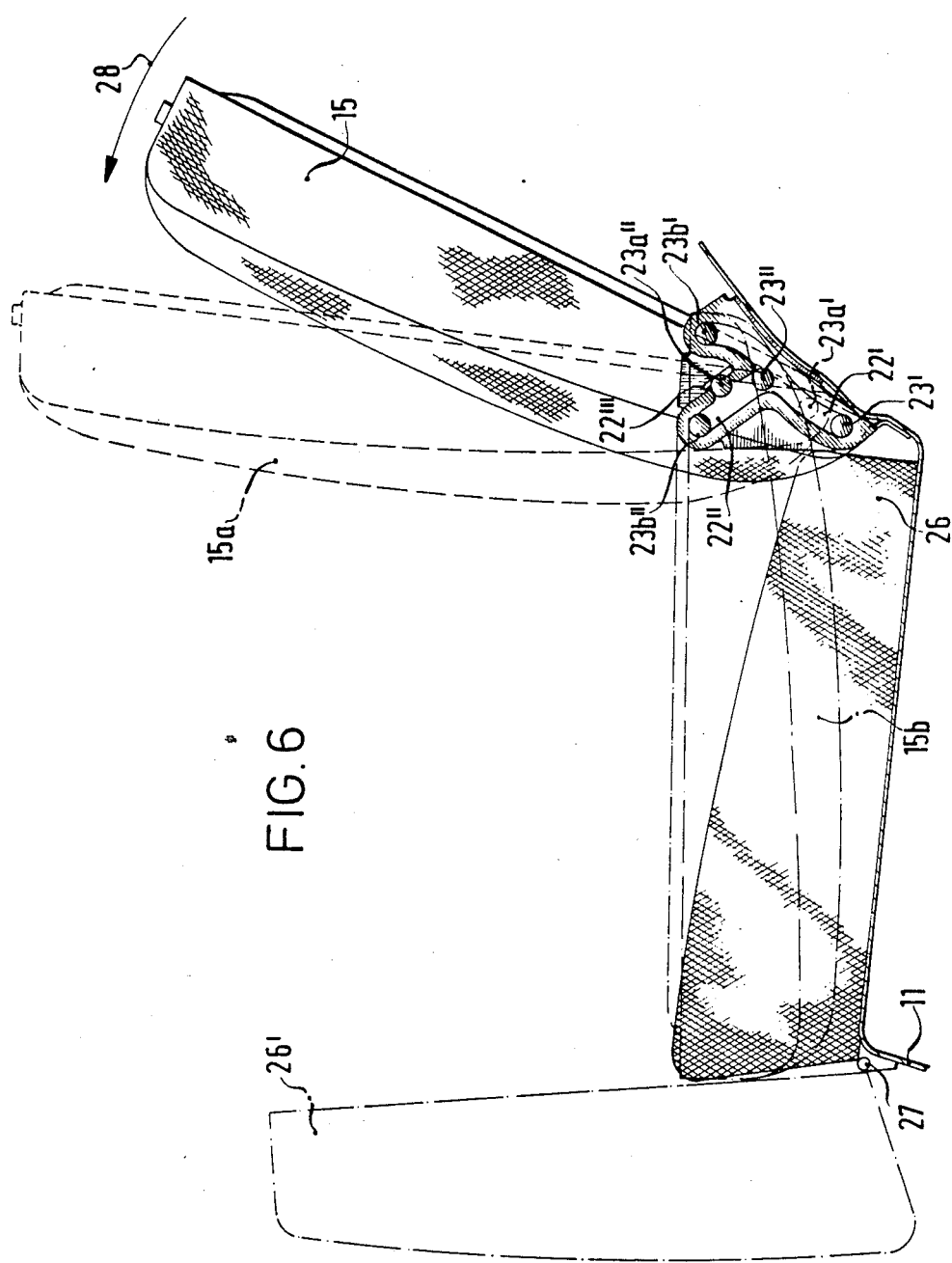

In the schematic cross-sectional illustration according to FIG. 1, the body of a passenger car is generally designated by the numeral 10, whereas the numeral 11 denotes the floor panel, 12 and 13 the left and right side panels, respectively, and 14 the roof of the vehicle. Of the vehicle rear seat, only the split seat back with the two seat back portions 15, 16 is being shown. Said seat back portions are mounted in hinges for swinging movement about a pivot axis 17 extending transversely of the vehicle. In FIG. 1 the seat back portions are illustrated in their upright or normal (seat occupying) position.

Each of the two seat back portions 15, 16 is also provided with lateral latching means 18, 19 for locking engagement with the left and right side panel 12 and 13, respectively. The lateral latching means 18, 19 are adapted for independent manual actuation. Lateral latching means of this type are known in principle and therefore are only schematically illustrated in the drawings. In the exemplary embodiment of the invention, said latching means are comprised of one lock for each seat back portion, each lock being adapted to cooperate with respective pins provided on the side panels 12 and 13.

As indicated in FIGS. 2 to 5, the outer and inner hinges disposed in the proximity of the floor panel for receiving the seat back portions are comprised, respectively, of appropriately shaped sheet metal members 21 provided with slots 22 and pairs of pins 23 which are secured to the frame of the seat back portions and adapted for engagement with said slots 22 so as to be guided therein. Each of the stamped sheet metal members 21 is spot-welded to the vehicle body through welding tabs 24. In FIG. 2 the sheet metal member 21 is welded to the lower portion of the left body panel 12. However, the same sheet metal member may also be used, analogously, for the inner hinge associated with the right seat back portion 16 and, in a mirror image arrangement, for attachment to the lower portion of the right-hand body panel 13 as well as for use as part of the inner hinge associated with the left seat back portion 15. The guide slots 22 in each of the sheet metal members 21 are Y-shaped (FIG. 4), i.e., they are comprised of a first, slightly undulated, symmetrical S-shaped guide track 22' from which a second guide track 22" is branching off so as to form a fork and render the guide track 22 Y-shaped. In the vicinity of the juncture of the Y-branch, the second track 22" is provided with an upwardly open mounting slots 22''' for insertion of the guide bolts 23', 23" of a pair of bolts 23.

As described in the foregoing, the pair of sheet metal members 21 of the inner hinges may be in the form of two structurally like parts that are arranged in mirror image position relative to one another. However, in the arrangement illustrated in FIGS. 3 and 5, preference was given to a single-unit structure, i.e., the pair of sheet metal members 21 is arranged in a mirror image position relative to one another and punched out as one piece. One half of the stamping is then folded by 180° at the juncture 25, and the members are subsequently placed into proper position relative to each other.

The installation and removal procedure, as well as the procedure for pivoting the seat back portions shall now be described by way of reference to the drawings in FIG. 6. Reference numeral 26 denotes a seat bottom which is in the form of a one-piece seat bench. This seat bench is mounted to the vehicle floor 11 by way of laterally disposed pivot bearings 27 and is adapted for forward swinging movement so as to assume an upright position. The seat back portion 15a indicated by the dotted lines illustrates the seat back installation position. The seat back portion is inserted from above into the forks of the Y-shaped sheet metal members 21. This will cause the lateral guide bolts 23' to drop through the mounting slots 22''' and to slide downwardly in the guide track 22'' and into the guide track 22', as indicated by reference numeral 23a'. Subsequently, the guide bolts 23'' will also pass through the mounting slot 22''' and will follow the same path, as indicated by reference numeral 23a''. The bolts 23' will eventually move to the lower end of the track 22', and the bolts 23'' will assume a position at a point where the track 22'' branches off from the track 22'. This position of the seat back portion 15 corresponds to the normal ready-to-occupy position. The removal of the seat back portions proceeds in the same fashion but in reversed order, i.e., each seat back portion can be moved out of its installed position by being lifted out of the guide tracks.

In order to convert the area occupied by the rear seat into a supplementary cargo space, the seat bench and the seat back portions are adapted to be folded out of the way. This is done in that the bench 26 is pivoted about the transversely extending pivot axes of the pivot bearings 27 and is put into a substantially vertical position 26' as indicated by the dotted lines. Subsequently, the seat back portions 15, 16, after having been unlatched from their respective locks 18, 19, are pivoted, either jointly or individually, in the direction indicated by arrow 28 and folded down into a substantially horizontal position 15b as indicated by the dash-dotted lines. During this procedure, the bolts 23', 23'' are moving along the tracks and into the upper end positions 23b' and 23b'' within the guide tracks 22' and 22'', respectively. The bolts 23', which are provided at their free ends with collars 29 and 29', respectively, provide proper lateral guiding when the seat back portions are being pivoted. For this purpose it is sufficient that only the bolts 23' of the outer hinges of the seat back portions be provided with additional inner collars 29' which serve as lateral stops for the guide slots 22.

The embodiments of the invention in which an exclusive property or privilege is claimed are defined as follows:

1. A pivotable back rest assembly for use in an automotive vehicle having body support structure, said back rest assembly comprising a back rest and hinge means for pivotally supporting said back rest for movement between an upright seat occupying position and a generally horizontal cargo carrying position, said hinge means including stationary hinges adapted to be secured to the vehicle body structure and having guide slot means therein and pairs of vertically spaced hinge pins carried by the back rest and extending laterally thereof, each of said pairs of hinge pins being slidably received within one of said guide slot means of a stationary hinge means and with the latter supporting said back rest for pivoting movement about an axis variable in height when the back rest is moved between its positions, the improvement being that said guide slot means are generally Y-shaped to define first and second intersecting guide paths to guide the movement of said hinge pins so as to enable said back rest to be moved between its generally upright and horizontal positions and that said stationary hinges are provided with an upwardly facing opening adjacent the fork of the generally Y-shaped guide slot means for allowing entry and removal of the hinge pins on the back rest into and out of the guide slot means to enable the back rest to be readily assembled to and disassembled from the stationary hinges.

2. A pivotable back rest assembly for use with a seat in an automotive vehicle having body support structure for supporting the seat and back rest assembly, said back rest assembly comprising a back rest and hinge means for pivotally supporting the back rest for movement between generally upright seat occupying position and a generally horizontal cargo carrying position, said hinge means including first and second spaced stationary hinges securable to the vehicle body structure and each of which has a guide slot means adjacent the back rest at its lower end and first and second pairs of vertically spaced hinge pins carried by the lower end of the back rest and extending laterally of its sides, said first and second pairs of hinge pins being slidably received in the guide slot means of said first and second stationary hinges, respectively, and with the latter suppoting the back rest for pivotal movement about an axis variable in height when the back rest is moved between its positions, the improvement being that said guide slot means of said first and second stationary hinges are generally Y-shaped to define a first elongated guide path for receiving one of said guide pins of one of said pairs of guide pins and a second shorter guide path which intersects the first guide path between its ends and which receives the other of said guide pins of one of said pairs of guide pins, said guide pins of each pair slidably moving from one end to the other end of their respective guide paths when the back rest is moved between its positions, and wherein said stationary hinges have upwardly facing openings in communication with the guide slots adjacent their fork to enable the guide pins to be readily inserted into and removed from the guide slot means so that the back rest can be readily assembled to and disassembled from the stationary hinges.

3. A pivotable seat and back rest assembly for an automotive vehicle having body support structure for supporting the seat and back rest assembly, said seat being pivotally supported adjacent its front end by the body structure for movement about a generally horizontal axis between a horizontal seat occupying position and a vertical position spaced from the back rest assembly, said back rest assembly comprising a back rest and hinge means for pivotally supporting the back rest for movement between generally upright seat occupying position and a generally horizontal cargo carrying position, said hinge means including first and second spaced stationary hinges secured to the body structure of the vehicle and each of which has a guide slot means located adjacent the back rest at its lower sides and first and second pairs of vertically spaced hinge pins carried by the lower end of the back rest and extending laterally of its sides, said first and second pairs of hinge pins being slidably received in the guide slot means of said first and second stationary hinges, respectively, and with the latter supporting the back rest for pivotal movement about an axis variable in height when the back rest is moved between its positions, the improvement being that said guide slot means of said first and second stationary hinges are generally Y-shaped to define a first S-shaped elongated guide path for receiving one of said guide pins of one of said pairs of guide pins and a second shorter straight guide path which intersects the first guide path between its ends and which receives the other of said guide pins of one of said pairs of guide pins, said guide pins of each pair slidably moving from one end to the other end of their respective guide paths when the back rest is moved between its positions, and wherein said stationary hinges have upwardly facing openings in communication with the second guide paths adjacent their intersection with the first guide paths to enable the guide pins to be readily inserted into and removed from the guide slot means so that the back rest can be readily assembled to and disassembled from the stationary hinges.

4. A back rest assembly in accordance with claim 2, and wherein the hinge pins are shaped as members of a round rod bent into U-form and with at least one of the hinge pins having a collar at its free end for slidably retaining the hinge pin with the guide slot means.

5. A back rest assembly in accordance with claim 4, and wherein the hinge pins have a further inner collar which is adjacent the other collar 29 and that both collars enclose the slot guide 22 and form a lateral guide for the back rest in a direction transverse to the back rest.

6. A back rest assembly in accordance with claim 3, and wherein the hinges 20 and the guide slot means 22 are arranged at the side walls 12, 13 of the motor vehicle.

7. A back rest assembly in accordance with claim 6, wherein in addition to the hinges arranged at the side walls of the vehicle, there is also provided a central hinge means arranged on the vehicle floor centrally of the back rest assembly.

8. A back rest assembly in accordance with claim 7, and wherein the hinges are made from sheet metal.

9. A back rest assembly in accordance with claim 6, and wherein the central hinge means comprises a pair of hinges stamped from sheet metal and folded back to back to provide a pair of oppositely facing hinges.

* * * * *